April 3, 1962 E. A. CHILTON 3,028,534
VARIABLY DAMPED SERVO-CONTROL SYSTEM
Filed March 2, 1960 2 Sheets-Sheet 1

INVENTOR.
EDWARD A. CHILTON
BY Herbert L. Davis
ATTORNEY

United States Patent Office 3,028,534
Patented Apr. 3, 1962

3,028,534
VARIABLY DAMPED SERVO-CONTROL SYSTEM
Edward A. Chilton, Jersey City, N.J., assignor to The Bendix Corporation, a corporation of Delaware
Filed Mar. 2, 1960, Ser. No. 12,297
12 Claims. (Cl. 318—448)

This invention relates to a servomotor control system and more particularly to such a system in which there is provided novel means for varying an applied rate signal as well as the gain of a servomotor amplifier with the adjusted position of the servomotor output shaft so as to correct for servomotor control signals which may vary with unit change in a measured condition over a wide operating range and with which the adjusted position of the servomotor output shaft is so synchronized as to provide the servo-amplifier with high gain and low damping in the range of relatively low input control signals for unit of change in the measured condition and with low gain and high damping in the range of relatively high input control signals for such unit of change in the measure condition.

The invention is directed to the solution of a problem encountered in servo control systems in which a sensing device produces a signal in response to a unit change in a sensed condition such as atmosphere density or pressure to provide a measure for another condition such as the prevailing altitude at the sensed level and in which the measured condition or altitude for each unit of change in the sensed condition may vary over a wide operating range. Accordingly a sensed unit of change in the atmospheric density or pressure at a relatively high altitude may be indicative of a greater measure of change in the altitude than the same unit of change in the atmospheric density or pressure at a somewhat lower altitude. Thus in such servo control systems the sensing device may produce a signal corresponding to the measured condition which varies not only with each unit of change in the sensed condition, but also as a function of the indicator shaft positioned by the servo system, i.e., the altitude level of the sensed atmospheric condition. Thus, at relatively low altitudes the sensing device may apply a relatively high input signal to an amplifier of the servo control system for each unit of change in the measured condition, while at relatively high altitudes the sensing device may apply a relatively low signal to the amplifier of the servo control system for each unit of change in the measured condition. The effect of the resulting variance in the input signals to the servo control system is to adversely effect the sensitivity and the speed of response of the system. An object of the invention, therefore, is to provide novel means for stabilizing the servo characteristics of the servo system when such a sensing device is used therein.

Another object of the invention is to provide an adjustable means mechanically connected to the servomotor output shaft and operatively connected in the servo system so as to vary both the gain of a servo-amplifier and the amount of degenerative feedback thereto so that as a function of the position of the servomotor output shaft, the gain and amount of the feedback to the amplifier may be varied over a wide operating range.

Another object of the invention is to provide an adjustable means mechanically connected to the servomotor output shaft and operatively connected in the servo system so as to vary a rate signal applied thereto as a function of the position of the servomotor output shaft, together with other means for varying the rate signal as a function of the driven speed of the servomotor.

Another object of the invention is to provide an adjustable resistor element mechanically connected to the servomotor output shaft and electrically connected in the servosystem so as to vary directly the gain of the servo-amplifier while simultaneously varying inversely the damping effect of a rate signal applied to the system with changes in the prevailing altitude indicated as a function of the position of the servomotor output shaft, together with other means for varying the rate signal as a function of the driven speed of the servomotor.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

Figure 1:
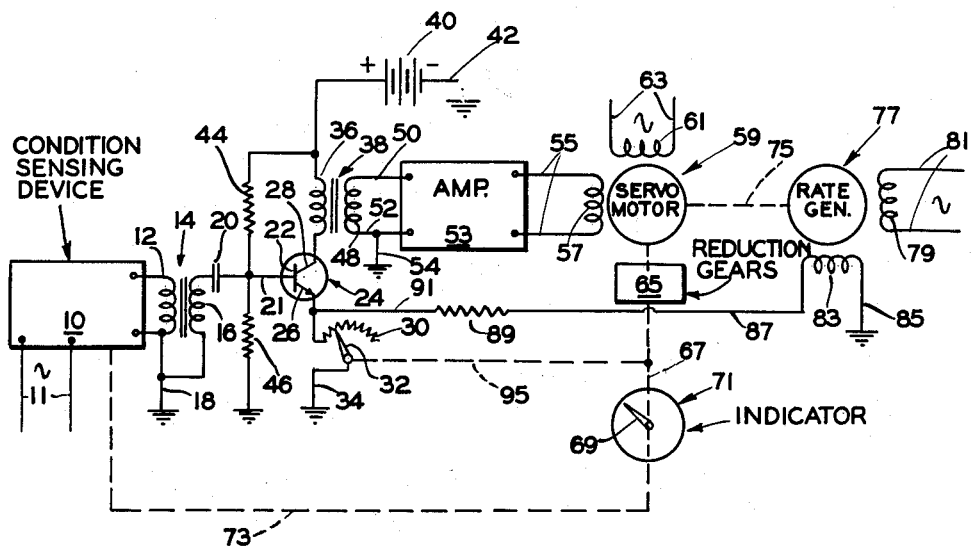
FIGURE 1 is a wiring diagram illustrating one form of the invention.

Referring to the drawing of FIGURE 1, there is indicated by the numeral 10 a sensing device operatively connected by conductors 11 across a suitable source of alternating current. The sensing device 10 may be an ionization gauge for altitude measurements such as disclosed and claimed in the copending U.S. application Serial No. 693,323 filed October 30, 1957 by George V. Zito and assigned to Bendix Aviation Corporation, the assignee of the present invention, or the sensing device 10 may be of other suitable types such as disclosed in FIGURE 3 having the characteristic of providing an alternating current output control signal in response to the sensed condition and which signal may vary with change in the measured condition over a wide operating range, as shown in FIGURE 4.

Thus, a change in the sensed condition or atmospheric density or pressure at a relatively low altitude will provide a relatively high output control signal for each unit of change in the measured condition or altitude, while change in the sensed condition at somewhat higher altitudes will provide a relatively lower output signal voltage for each unit of change in the measured condition or altiude. Such output control signal, as shown in FIGURE 1, is applied across a primary winding 12 of an induction transformer 14 and in turn to a secondary winding 16 inductively coupled thereto. The secondary winding 16 is at one end grounded at 18 and coupled at the opposite end of a capacitor 20 and conductor 21 to the base 22 of a transistor 24 having an emitter 26 and collector 28. The emitter 26 is in turn connected through a variable resistor element 30 and an adjustable arm 32 to a ground through a conductor 34. The collector 28 is in turn connected through a primary winding 36 of induction transformer 38 to the positive terminal of a source of biasing voltage such as a battery 40 having a negative terminal grounded at 42. The posiitve terminal of the battery 40 is also connected through a resistor element 44 to the conductor 21 leading from capacitor 20 to the base 22. Also connecting lead 21 to ground is second resistor element 46.

The signal voltage, as thus amplified by the transistor 24, is applied through the primary winding 36 of the transformer 38 and induced into the secondary winding 48 connected through conductors 50 and 52 to the input of servo-amplifier 53. The input conductor 52 is grounded at 54.

The amplifier 53 may be of conventional type having output conductors 55 connected to a control winding 57 of a servomotor 59. The servomotor 59 may be of a conventional two-phase type having a fixed phase winding 61 connected by conductors 63 to a suitable source of alternating current.

The servomotor 59 is drivingly connected through a reduction gearing 65 and shaft 67 to a pointer 69 of an indicator 71. The indicator pointer 69 is in turn connected through a follow-up shaft 73 to the sensing device 10 where it serves to adjust the device 10 so as to null the output signal, as explained in the aforenoted U. S. application Serial No. 693,323 or as shown schematically in FIGURE 3.

In addition, the servomotor 59 drives through a shaft 75 a rate generator 77 of a conventional type having an exciting winding 79 connected through conductors 81 to the suitable source of alternating current and an output winding 83 grounded at 85 and connected through a conductor 87, resistor element 89 and conductor 91 to the emitter 26 of the transistor 24 and in turn through the variable resistor element 30, adjustable resistor arm 32 and conductor 34 to ground. The variable resistor arm 32 is in turn mechanically connected through the reduction gearing 65 by the servomotor 59.

Operation

In the aforenoted arrangement of FIGURE 1, it will be seen that the grounded emitter transistor amplifier 24 is incorporated in the input signal flow path of the servoamplifier 53. Further, the variable resistor element 30 is also in the input signal flow path in the emitter circuit and is ground connected at 34 so as to provide a negative feedback (degeneration) in this first stage af amplification. Resistor 46 is ground connected and in conjunction with resistor 44 stabilizes the operating bias of transistor 24. Furthermore, the adjustable arm 32 of the variable resistance 30 is mechanically connected through shaft 95 to the servomotor driven shaft 67 so that as a consequence of the varying positions of the shaft 67 the corresponding adjustment of the arm 32 varies the ohmic value of the resistor 30. Such variations in the value of the resistor 30 serves to vary both the gain of the transistor stage amplifier 24, and the amount of degenerative feedback in this stage of amplification. Thus, as a function of the position of the shaft 67, the gain and the amount of feedback of the amplifier stage 24 may be varied over a wide range so as to compensate for the variations in the signal voltage per unit of change in the measured condition such as altitude under, for example, high and low altitude conditions, as shown graphically in FIGURE 4.

Simultaneously, with the variations in the gain of the amplifier 53 and the amount of the aforenoted feedback, it will be seen from FIGURE 1 that a rate signal voltage derived from the rate signal generator 77 driven by the servomotor 59 is fed back to the emitter 26 and across the variable resistor 30 and through the series resistor 89. The rate signal thus fed back by the rate generator 77 is proportional to the ratio of the resistances of the resistors 30 and 89. Moreover, since the resistance of the resistor 30 varies as a function of the position of the motor driven shaft 67, the rate signal will also vary as a function of the position of the shaft 67, as well as with the velocity of the servomotor 59 which drives the rate generator 77 and which results in varying the speed of response of the servo system as a function of both factors.

The total effect of this arrangement is to provide higher gain in the transistor amplifier 24 with little damping for the aforenoted low voltage signals for unit of change in the measured altitude condition, while also providing a lower gain in the amplifier 24 with a larger degree of damping for the aforesaid high voltage signals for the unit of changed in such measured altitude condition, as shown graphically in FIGURE 4. The variable resistor 30 thus performs several separate and discrete functions in improving the performance of the servo system.

Modified Form of the Invention

In the modified form of the invention shown in FIGURE 2 in which like numerals indicate corresponding parts to those heretofore described with reference to FIGURE 1, it will be seen that one of the output conductors 55 leading from the amplifier 53 to the control winding 57 of the servomotor 59 is grounded at 90 while the opposite output conductor is connected by a resistor element 92 to the conductor 91 leading to the emitter 26 of the transistor 24.

Figure 2:
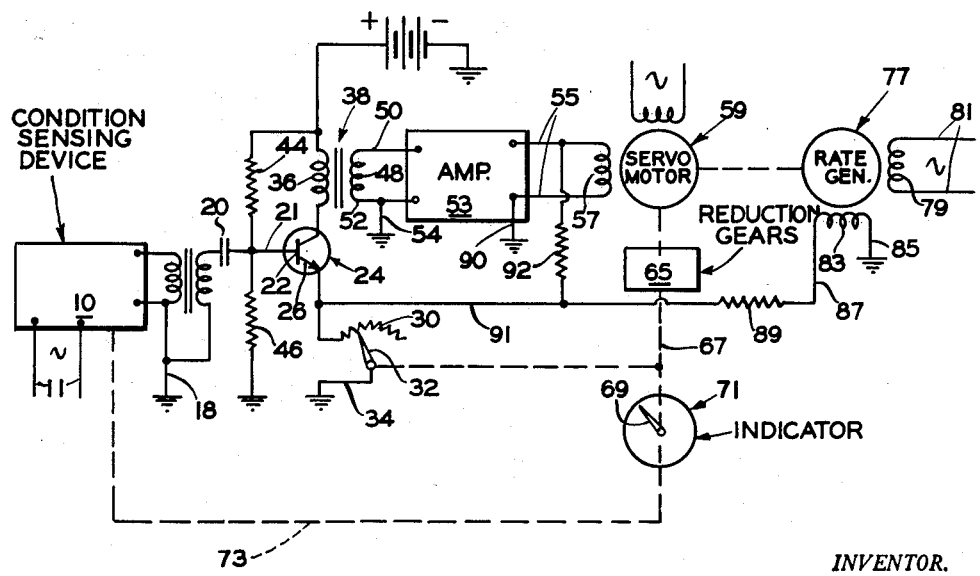
FIGURE 2 is a wiring diagram illustrating a second form of the invention.

Thus, in the circuit of FIGURE 2, the overall feedback of the multi-stage amplifier, including the transistor amplifier 24 and the amplifier 53, is also applied through the variable resistor 30 so that the feedback ratio (Beta) in the overall feedback loop of such multi-stage amplifier is also controlled by the position of the shaft 67 driven by the servomotor 59, in addition to the rate signal feedback applied through the resistor 89 and the variable resistor element 30, and the degenerative feedback of the transistor stage 24 applied through the variable resistor element 30, and grounded connection 34.

The circuit arrangement of FIGURE 2, similar to that of FIGURE 1, also varies inversely the amplifier gain and directly the rate signal with the variations in the voltage control signals per unit of change in the measured altitude condition. The degenerative feedback applied through resistor element 92 serves to increase the gain variation by taking the voltage from the output lines 55 of the multi-stage amplifier and feeding it back into the emitter 26 of the first stage so that the variable resistor element 30 then controls the overall negative feedback ratio in accordance with the adjusted position of the servomotor driven shaft 67 so as to compensate thereby for the variations in signal voltages resulting per unit of change in the measure altitude condition over the wide operating range indicated graphically in FIGURE 4.

Third Modified Form of the Invention

In the third modified form of the invention shown in FIGURE 3, corresponding numerals indicate corresponding parts to those heretofore described with reference to FIGURES 1 and 2. Furthermore, referring to the drawing of FIGURE 3, there is indicated by numeral 105 a diaphragm or bellows responsive to a condition of fluid pressure such as ambient atmospheric pressure prevailing at the altitude of an aircraft and effective through the servo control mechanism shown diagrammatically in the drawing to control an indicator device 71 having an altitude indicator arm 69 operatively positioned in response to the altitude conditions of the aircraft in which the mechanism may be mounted.

The bellows 105 is operatively connected through a suitable linkage indicated diagrammatically by the numeral 109 to an armature or magnetic control vane 111 of an E pick-up device indicated generally by the numeral 113 and including an energizing winding 115 connected to a suitable source of alternating current and inductively coupled to a control winding 116 through the E-shaped core 117 and armature 111 so as to control the phase and magnitude of the alternating current induced in the winding 116 depending upon whether the fluid pressure sensed by the bellows 105 has increased or decreased with regard to the value of the pressure altitude indicated by the arm 69. The core 117 is operatively connected to the shaft 73 and so arranged as to be adjusted relative to the vane or armature 111 through operation of the follow-up shaft 73. The shaft 73 is connected to the output shaft 67 of the servomotor 59 and indicator arm 69 so that servomotor adjustment thereof may effect a return of the core 117 to a null position relative to the armature 111 and wipe out the error signal induced in the windings 116 and applied across output lines 123 and 125 leading from the E pick-up 113 to the primary winding 12 of the transformer 14.

Thus, a change in the fluid atmospheric pressure applied to the diaphragm 105 will cause a change in the displacement of the E pick-up vane 111 and result in an output error voltage from the E pick-up. This error voltage is in turn applied to the primary winding 12 of inductive transformer 14 and through the secondary winding 16 inductively coupled thereto. The secondary winding 16 is coupled through capacitor 20 and grounded connection 18 across a grid 130 and cathode element 131 of an electronic valve 133 of conventional type. The electronic valve 133 may in turn have a plate element 134 connected to the primary winding 36 of the induction transformer 38 and through the winding 36 to the positive terminal of the source of biasing voltage or battery 40 having a negative terminal connected to ground through the conductor 42.

Figure 3:
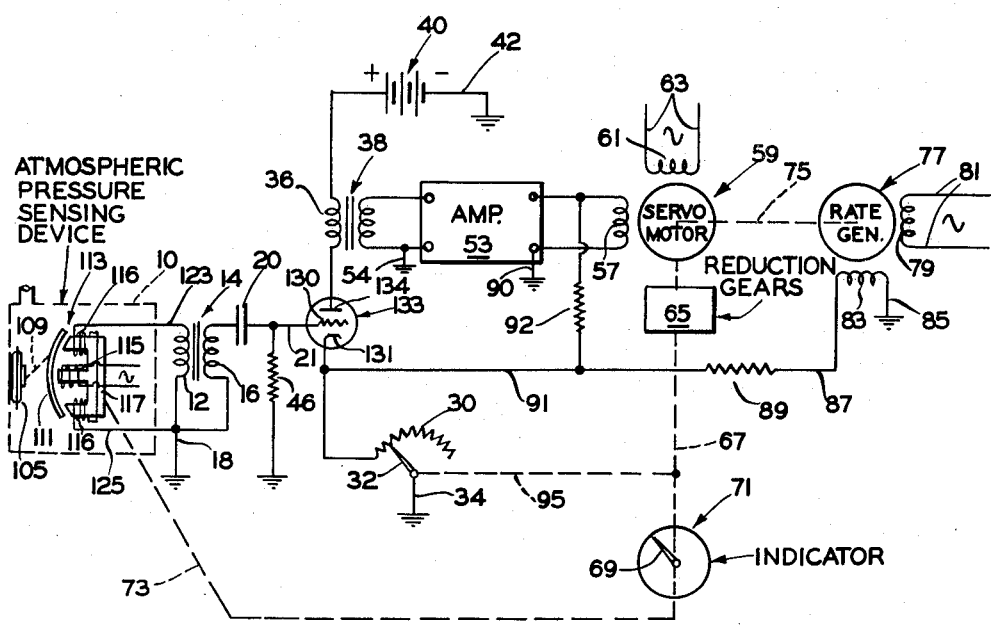
FIGURE 3 is a wiring diagram illustrating a third form of the invention.
Figure 4:
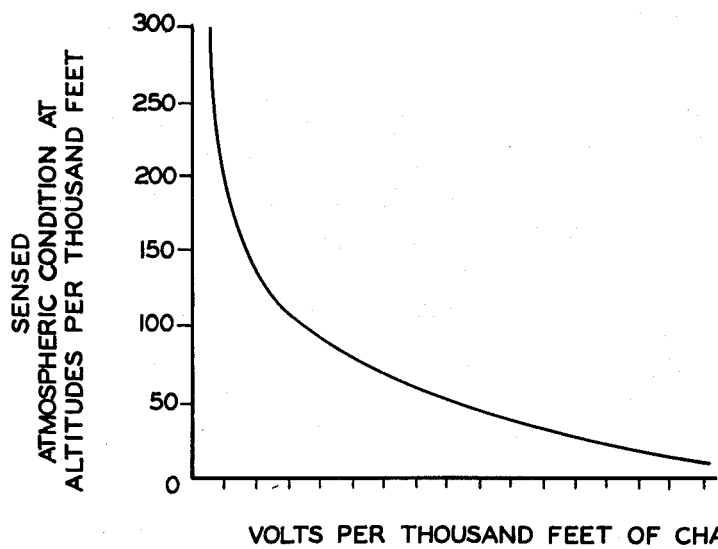
FIGURE 4 is a graphical illustration showing variance in the signal voltage supplied by an atmospheric condition sensing device with unit of change in a measured altitude over a wide operating range and shown for purposes of graphical illustration as volts per thousand feet of change.

As explained, with reference to the circuits of FIGURES 1 and 2, the ohmic value of the resistor 30 varies as a function of the position of the shaft 67 driven by the servomotor 59 and the resistor 30 is so connected in the system, as shown in FIGURE 3, that the gain of the first stage of the amplification as well as the amount of degenerative feedback in this stage is varied as a function of the position of the servo driven shaft 67 as well as the gain and overall feedback of the multi-stage amplifiers 133 and 53 together with the rate signal feedback applied through the resistor 89 and across the variable resistance 30 so as to provide the desired result of effecting higher gain in the servo-amplifier with little damping for those lesser voltage signals per unit of change in the measured altitude condition, while effecting a lower servo-amplifier gain with greater damping for the greater signals per unit of change in the measured altitude condition over the wide operating range indicated graphically in FIGURE 4.

Thus, in the servomotor control circuits of FIGURES 1, 2 and 3, as the measured altitude is increased from a given level the resistance of the variable resistor element 30 is decreased in response to a corresponding adjustment in the angular position of the indicator shaft 67 driven by the servomotor 59. The decrease in the resistance of the variable resistor element 30 acts to decrease the negative feedback applied to the servomotor amplifier and increase the gain of the first stage amplifier 24 of FIGURE 1 and the overall gain of the multi-stage amplifiers of FIGURES 2 and 3 while simultaneously decreasing the effect of the rate signal applied by the rate generator 77 through the resistor element 89 to the emitter 26 of FIGURES 1 and 2 or to the cathode element 131 of FIGURE 3 and through the grounded variable resistor element 30 to the grounded output winding 83 of the rate generator 77.

Conversely as the measured altitude is decreased from a given level the resistance of the variable resistor element 30 is increased in response to a corresponding adjustment in the angular position of the indicator shaft 67 driven by the servomotor 59. The increase in the resistance of the variable resistor element acts to increase the negative feedback applied to the servomotor amplifier and decrease the gain of the first stage amplifier 24 of FIGURE 1 and the overall gain of the multi-stage amplifiers of FIGURES 2 and 3 while simultaneously increasing the effect of the rate signal applied by the rate generator 77 through the resistor element 89 to the emitter 26 of FIGURES 1 and 2 or to the cathode element 131 of FIGURE 3 and through the grounded variable resistor element 30 to the grounded output winding of the rate generator 77.

Although several embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a control system of a type including a variable speed electric motor, an output shaft angularly positioned by the motor, an input control network for said motor, a rate generator driven by said motor so as to effect an output voltage varying with the speed of said motor, and circuit means for impressing the output voltage from said generator on the input control network for damping the control of said motor; the improvement comprising control means to vary the effect of the generator output voltage on the input control network, and means for operatively connecting the output shaft to said variable control means so as to adjust said control means as a function of the angular position of the shaft to thereby vary the damping effect of the generator output voltage on said input control network.

2. In an altitude indicator control system of a type including a variable speed electric motor, an output shaft angularly positioned by the motor for operating the altitude indicator, an input control network for said motor including a sensing device responsive to varying atmospheric conditions over a wide range of altitudes, a rate generator driven by said motor so as to effect an output voltage varying with the speed of said motor, means for impressing the output voltage from said generator on the input control network for damping the control of said motor by said sensing device; the improvement comprising control means to vary the effect of said generator output voltage on the input control network, means for operatively connecting the output shaft to said variable control means so as to adjust said control means as a function of the angular position of the output shaft, and said connecting means operatively connecting said output shaft to said control means in such a manner as to vary inversely the damping effect of the generator output voltage on said input control network with changes in the altitude indicated by said indicator.

3. In a control system of a type including a variable speed electric motor, an output shaft angularly positioned by the motor, an input control network for said motor including a condition sensing devices and a variable gain amplifier means between the sensing device and said motor; the improvement comprising variable resistance control means operatively connected between the condition sensing device and said amplifier means to vary the gain of said amplifier means, and means for operatively connecting the output shaft to said variable resistance control means so as to adjust said variable resistance control means and thereby the gain of said amplifier means as a function of the angular position of the shaft.

4. In a control system of a type including a variable speed electric motor, an output shaft angularly positioned by the motor, an input control network for said motor including a condition sensing device and a variable gain transistor amplifier having a base, a collector and an emitter operatively connected in the control network for amplifying control signals supplied by the sensing device to the motor; the improvement comprising a variable resistor element connected to the emitter to effect a negative feedback circuit for the transistor amplifier to vary the gain of said amplifier, and means operatively connecting the output shaft to said variable resistor element for adjusting the resistance of said element so as to thereby vary the gain of said transistor amplifier in response to an angular adjusted position of the output shaft.

5. In a control system of a type including a variable speed electric motor, an output shaft angularly positioned by the motor, an input control network for said motor including a condition sensing device and a variable gain electronic valve amplifier having a cathode, a plate and a control grid operatively connected in the control network for amplifying control signals supplied by the sensing device to the motor; the improvement comprising a variable resistor element connected to the cathode to effect a negative feedback circuit for the electronic valve amplifier to vary the gain of said amplifier, and means operatively connecting the output shaft to said variable resistor element for adjusting the resistance of said element so as to thereby vary the gain of the amplifier in response to an angular adjusted position of the output shaft.

6. In a control system of a type including a variable speed electric motor, an output shaft angularly positioned by the motor, an input control network for said motor including a condition sensing device and a multi-stage variable gain amplifier means having an input leading from said sensing device and an output leading to said motor; the improvement comprising a first variable resistor means to effect a negative feedback circuit for a first stage of said multi-stage amplifier means, a second resistor means serially connected to said first variable resistor means to effect a negative feedback circuit from the output of the multi-stage amplifier means to the first stage of said amplifier means, and means for operatively connecting the output shaft to said first variable resistor means for adjusting the resistance of said first resistor means and thereby the effective negative feedback applied through said circuits to vary the gain of said amplifier means in response to an angular adjusted positions of the output shaft.

7. In a control system of a type including a variable speed electric motor, an output shaft angularly positioned by the motor, an input control network for said motor including a condition sensing device and a variable gain amplifier means between the sensing device and said motor, a rate generator driven by said motor so as to effect an output voltage varying directly with the speed of said motor and circuit means for impressing the output voltage from said generator on the input control network to provide a damping effect on the control of said motor; the improvement comprising control means to vary the gain of said amplifier means and the damping effect of the generator output voltage, and means for operatively connecting the output shaft to said control means so as to vary both the gain of said amplifier means and the damping effect of the generator output voltage on said input control network as a function of the angular position of the shaft.

8. In an altitude indicator control system of a type including a variable speed electric motor, an output shaft angularly positioned by the motor for operating the altitude indicator, an input control network for said motor including a sensing device responsive to varying atmospheric conditions over a wide range of altitudes and a variable gain amplifier means between the sensing device and said motor, a rate generator driven by said motor so as to effect an output voltage varying directly with the speed of said motor, and circuit means for impressing the output voltage from said generator on the input control network to provide a damping effect on the control of said motor; the improvement comprising control means to vary the gain of said amplifier means and the damping effect of the generator output voltage, means for operatively connecting the output shaft to said variable control means so as to adjust said control means as a function of the angular position of the output shaft, and said connecting means operatively connecting said output shaft to said control means in such a manner as to vary directly the gain of said amplifier means while varying inversely the damping effect of the generator output voltage on said input control network with changes in the altitude indicated by said indicator.

9. In an altitude indicator control system of a type including a variable speed electric motor, an output shaft angularly positioned by the motor for operating the altitude indicator, an input control network for said motor including a sensing device responsive to varying atmospheric conditions over a wide range of altitudes and a multi-stage variable gain amplifier means having an input leading from said sensing device and an output leading to said motor, a rate generator driven by said motor so as to effect an output voltage varying directly with the speed of said motor, and circuit means for impressing the output voltage from said generator on the input control network to provide a damping effect on the control of said motor; the improvement comprising a first variable resistor means to effect a negative feedback circuit for a first stage of said multi-stage amplifier means, a second resistor means serially connected to said first variable resistor means to effect a negative feedback circuit from the output of the multi-stage amplifier means to the first stage of said amplifier means, said first variable resistor means being connected to the generator output voltage circuit means for varying the damping effect of the generator output voltage, means for operatively connecting the output shaft to said variable resistor means for adjusting the resistance thereof as a function of the angular position of said output shaft, and said connecting means operatively connecting said output shaft to said first variable resistor means in such a manner as to vary directly the gain of said amplifier means while varying inversely the damping effect of the generator output voltage on said input control network with changes in the altitude indicated by said indicator.

10. In an altitude indicator control system of a type including a variable speed electric motor, an output shaft angularly positioned by the motor for operating the altitude indicator, an input control network for said motor including a sensing device responsive to varying atmospheric conditions over a wide range of altitudes and a variable gain amplifier means between the sensing device and said motor; the improvement comprising control means to vary the gain of said amplifier means, means for operatively connecting the output shaft to said variable gain control means so as to adjust said control means as a function of the angular position of the output shaft, and said connecting means operatively connecting said output shaft to said control means in such a manner as to vary directly the gain of said amplifier means with changes in the altitude indicated by said indicator.

11. In an altitude indicator control system of a type including a variable speed electric motor, an output shaft angularly positioned by the motor for operating the altitude indicator, an input control network for said motor including a sensing device responsive to varying atmospheric conditions over a wide range of altitudes and a variable gain amplifier means between the sensing device and said motor, a rate generator driven by said motor so as to effect an output voltage varying directly with the speed of said motor, and circuit means for impressing the output voltage from said generator on the input control network to provide a damping effect on the control of said motor; the improvement comprising a variable resistor means to effect a negative feedback circuit for the amplifier means, said variable resistor means being connected between the sensing device and the amplifier means to vary the gain thereof and to the generator output voltage circuit means for varying the damping effect of the generator output voltage, and means for operatively connecting the output shaft to said variable resistor means so as to adjust the resistance of said means as a function of the angular position of the shaft, and said connecting means operatively connecting said output shaft to said variable resistor means in such a manner as to increase the resistance of said resistor means upon a predetermined decrease in the altitude as indicated by said indicator and to decrease the resistance of said resistor means upon a predetermined increase in the altitude as indicated by said indicator so that the gain of said amplifier means may be varied directly and the damping effect of the generator output voltage on the input control network may be varied inversely with the changes in the altitude indicated by said indicator.

12. In an altitude indicator control system of a type including a variable speed motor, an output member adjustably positioned by the motor for operating the altitude indicator, means for controlling said motor including a sensing device responsive to changes in altitude and variable gain amplifier means between the sensing device and said motor, and means driven by said motor for supplying a rate signal varying in intensity with the speed of said motor, and means for applying said rate signal to said control means so as to provide a damping effect on the control of said motor by said sensing device; the improvement comprising other control means operable to vary both the gain of said amplifier means and the damping effect of said rate signal, means operatively connecting said output member to said other control means so as to adjustably position said other control means in response to the adjusted position of the output member by said motor, and said other control means being operable by said output member through said connecting means in such a manner as to increase the gain of said amplifier means while decreasing the damping effect of said rate signal upon an increase in altitude and decrease the gain of said amplifier means while increasing the damping effect of said rate signal upon a decrease in altitude.

References Cited in the file of this patent
UNITED STATES PATENTS

| | | |
|---|---|---|
| 2,580,512 | Broadbent et al. | Jan. 1, 1952 |
| 2,722,646 | Rhyne et al. | Nov. 1, 1955 |

UNITED STATES PATENT OFFICE
CERTIFICATE OF CORRECTION

Patent No. 3,028,534                                April 3, 1962

Edward A. Chilton

It is hereby certified that error appears in the above numbered patent requiring correction and that the said Letters Patent should read as corrected below.

Column 2, line 54, after "end", second occurrence, insert -- by means --; line 63, for "posiitve" read -- positive --; column 3, line 24, after "through" insert -- a shaft 95 to the shaft 67 driven through --.

Signed and sealed this 24th day of July 1962.

SEAL)
Attest:

ERNEST W. SWIDER                                    DAVID L. LADD
Attesting Officer                                           Commissioner of Patents